(12) United States Patent
Nijhof et al.

(10) Patent No.: US 6,561,748 B2
(45) Date of Patent: May 13, 2003

(54) CONVEYOR FLOOR

(75) Inventors: Dirk Nijhof, Gramsbergen (NL); Frans Arian Heino De Raad, Coevorden (NL); Nicolaas Marc Mater, Hengelo (NL)

(73) Assignee: Cargomac B.V., Coevordan (NL)

( * ) Notice: Subject to any disclaimer, the term of this patent is extended or adjusted under 35 U.S.C. 154(b) by 0 days.

(21) Appl. No.: 09/922,108

(22) Filed: Aug. 3, 2001

(65) Prior Publication Data

US 2003/0026679 A1 Feb. 6, 2003

(51) Int. Cl.⁷ .............. B60P 1/36; B60P 1/38; B65G 17/42
(52) U.S. Cl. ............ 414/528; 198/851; 198/867.15
(58) Field of Search .......... 198/867.15, 851; 414/528

(56) References Cited

U.S. PATENT DOCUMENTS

| | | | | |
|---|---|---|---|---|
| 2,544,484 A | * | 3/1951 | Blackburn | 198/851 |
| 2,544,485 A | * | 3/1951 | Blackburn | 198/851 |
| 2,593,324 A | * | 4/1952 | Mann | 198/851 |
| 4,765,455 A | | 8/1988 | Matsuno et al. | 198/779 |
| 5,330,045 A | * | 7/1994 | Hodlewsky | 198/779 |
| 5,911,555 A | * | 6/1999 | Foster | 414/398 |

FOREIGN PATENT DOCUMENTS

| | | |
|---|---|---|
| DE | 1123254 | 2/1962 |
| EP | 0300700 | 1/1989 |
| FR | 2721291 | 12/1995 |
| JP | 59194918 | 11/1984 |

\* cited by examiner

Primary Examiner—Steven A. Bratlie
(74) Attorney, Agent, or Firm—Ladas & Parry

(57) ABSTRACT

A conveyor floor has a series of lamellas transverse to its conveyance direction. The lamellas have support surfaces for supporting a load to be conveyed. Ends of the lamellas are connected by coupling pieces to conveyor chains. The coupling pieces have portions which extend over the chains connected to the coupling pieces.

19 Claims, 4 Drawing Sheets

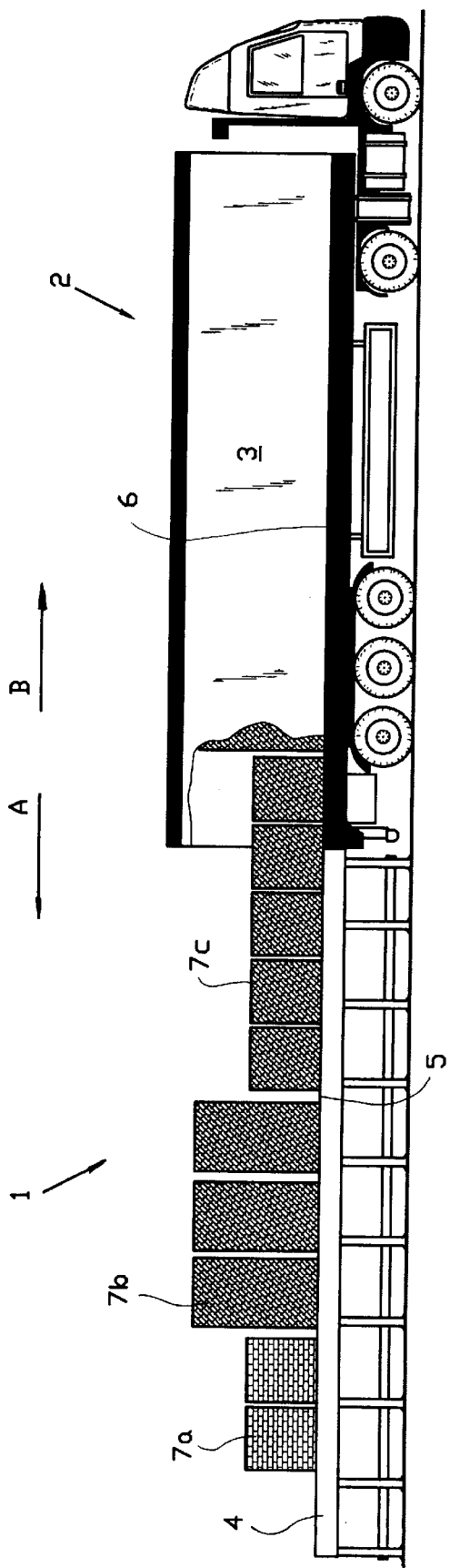
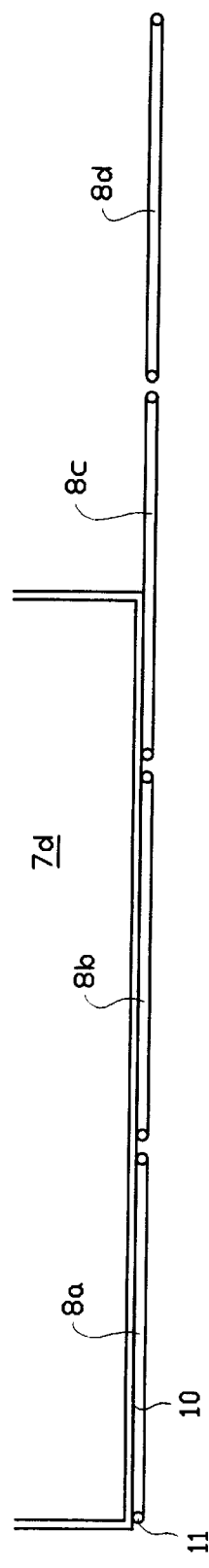
FIG. 1
FIG. 3

CONVEYOR FLOOR

BACKGROUND OF THE INVENTION

The invention relates to a conveyor floor, in particular a conveyor floor for a cargo space of a lorry (movable loading floor) and/or a loading/unloading track (stationary loading floor).

It is known to provide cargo spaces of lorries or trailers with floors for moving their loads. An example of this is a cargo space provided with slats that are reciprocally movable in conveyance direction. In such cases the floor is made of several groups of slats, in which each group is connected to its own driving cylinder.

Other examples are cargo spaces provided with roll or lamella floors. A lamella floor consists of a series of lamellas transverse to the loading/unloading direction. The lamellas are attached to chains that can be driven in the loading/unloading direction.

The lamellas are usually aluminium slats connected at their ends to the chains by means of coupling pieces. To that end, the coupling piece fittingly extends from a portion in the slat end with a receiving space for fittingly receiving the protruding portion of an extended chain link pin. Usually the chain situated next to the lamella end extends to near the bearing area of the lamella. Because of that, a load supported on the lamella may contact the chain, and get damaged as a result. This may cause damage to the supported product itself, particularly when it is hardly wrapped, as is the case with rolls of paper. Damage could be prevented by placing the load outside of the chain area, but this limits the useful loading area.

A solution for this is the continuation of the lamellas over the chain. To that end the ends of the lamellas have to brought into the correct shape, in case of sections by removing material. However this is time consuming and quite costly.

SUMMARY OF THE INVENTION

It is an object of the invention to provide a better alternative for the known solution. To that end the invention provides a conveyor floor comprising a series of lamellas positioned transverse to the conveyance direction and at the ends connected by means of coupling pieces to a conveyor chain situated adjacent to the lamellas, in which the lamellas have a support surface for supporting a load to be conveyed, in which the coupling pieces have a portion which extends over the chain connected to said coupling piece.

Thus the coupling piece which has to be used anyway for the coupling the,chain and lamella, is used for the upward shielding of the chain, so that the load cannot contact the chain. The coupling piece can easily be moulded or cast in the correct shape from a relatively cheap material. For instance moulding with a synthetic material, such as PE, or casting with aluminium, come to mind here.

Preferably the portion extending over the chain extends at least up to the outer side of the chain in question, so that the space above the chain may be used entirely for placing the cargo.

In an embodiment the portion extending over the chain supports on the chain with its lower side, so that there as well a load can be supported.

In an alternative embodiment the coupling piece extends to a level which remains spaced apart below the support surface of the lamellas. In that case the load cannot support on the coupling piece, so that a possibly necessary rolling movement of the chain parts cannot be impeded.

In a further embodiment of the conveyor floor according to the invention the coupling piece is attached to the chain, preferably is connected to the chain by means of a snap connection, as a result of which not only the mounting can be carried out more easily and reliably, but also coupling piece and chain are secured with respect to each other in transverse direction, as a result of which wear and tear of the parts and damage of the load is drastically prevented.

In an advantageous manner the lamellas may have a hollow receiving space for the insertion part of the coupling piece, which receiving space is upwardly and downwardly bounded, in which the insertion part merges into the portion extending over the chain, for instance via a narrowing.

The invention further provides a cargo space or lorry provided with a conveyor floor according to the invention.

The invention further provides a loading/unloading track provided with a conveyor floor according to the invention.

BRIEF DESCRIPTION OF THE DRAWING

The invention will be elucidated below on the basis of an exemplary embodiment shown in the attached figures, in which:

FIG. 1 schematically shows a loading/unloading arrangement in which use is made of the invention;

FIG. 3 schematically shows a cross-section of the loading floor of the lorry of FIGS. 2A and 2B;

DESCRIPTION OF EXEMPLARY EMBODIMENTS

Figure 2A:
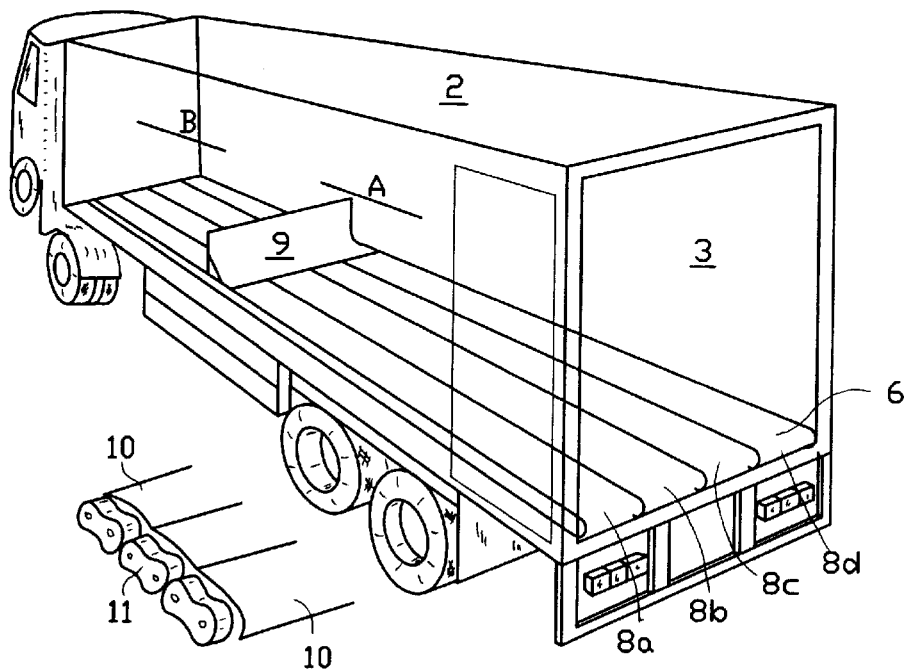
FIGS. 2A and 2B schematically show a loading floor according to the invention, accommodated in a lorry.

In FIG. 1 the loading/unloading arrangement 1 is shown with a lorry/trailer 2, which is provided with cargo space 3 having a loading floor 6. The trailer 2 is placed against the end of a loading/unloading track 4, as they are known from so-called distribution centres. The loading/unloading track 4 is provided with a conveyor floor 5, on which objects to be loaded or unloaded 7a, 7b and 7c have been placed. Both the loading/unloading floor 5 and the cargo space floor 6 can be designed as a so-called lamella floor, which is driven by the usual means which are not shown, either in the direction A or the direction B, in case of unloading and loading, respectively, of the trailer 2.

Figure 2B:
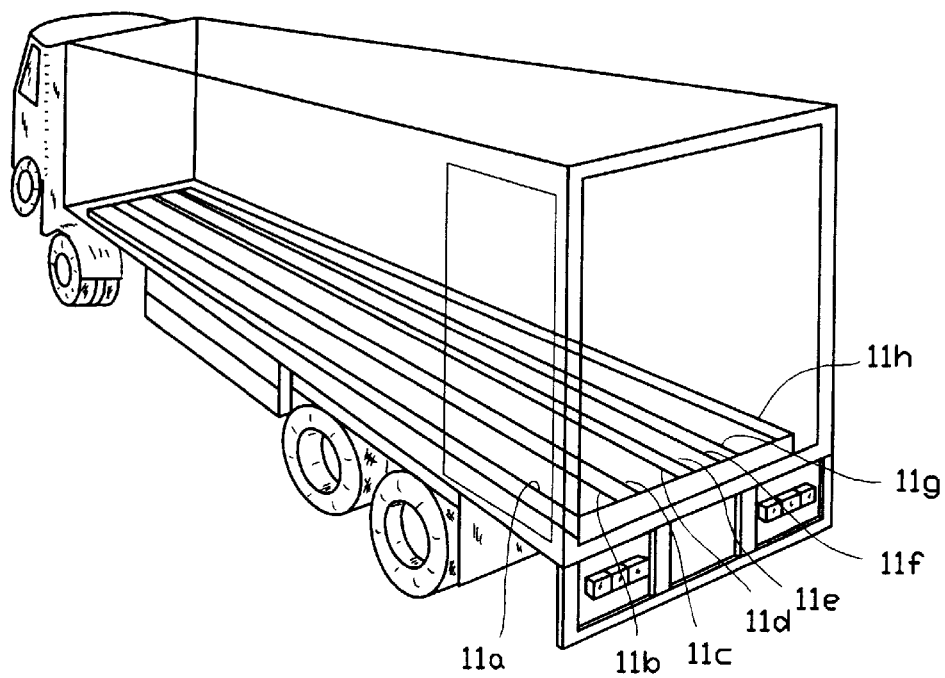

In the FIGS. 2A and 2B this is further elaborated on for the trailer 2. Here the cargo space floor 6 is built up in the known manner from four series 8a, 8b, 8c, 8d of lamellas 10, which may be made of aluminium. The aluminium lamellas are connected at opposite ends to respective chains 11a,b, 11c,d, 11e,f and 11g,h by means of coupling pieces. The chains are driven in the direction A or B in order to take the load placed on the lamellas 10 either into or out of the cargo space 3. At the inner end of the lamella series a partition 9 has been arranged, which prevents the load placed there from tilting to B during the conveying movement.

Figure 4A:
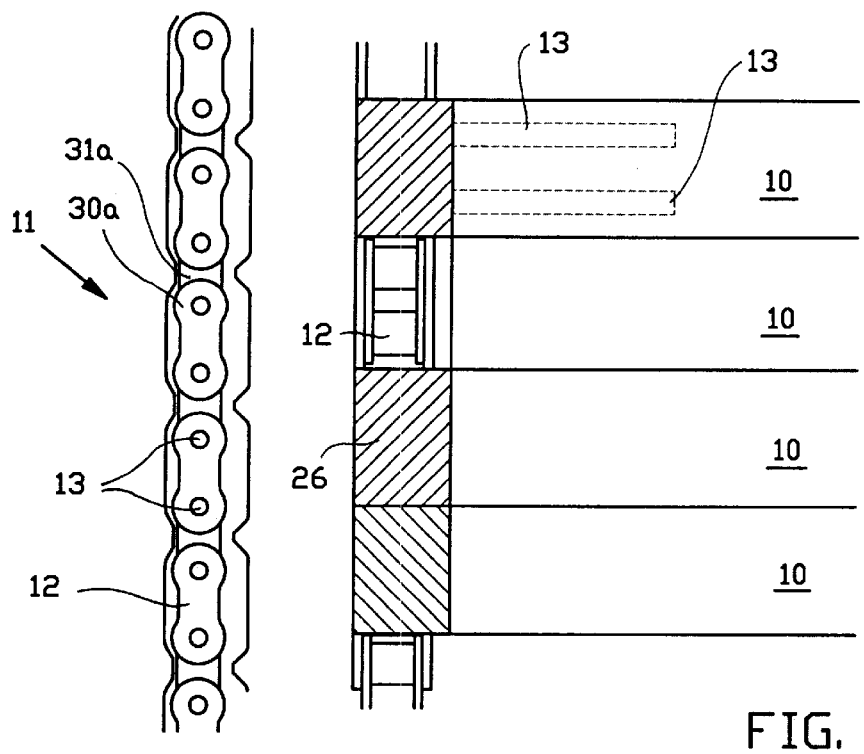
FIGS. 4A and 4B show a top view and a cross-section of a portion of a conveyor floor according to the invention.

As can be seen in FIG. 3 a load may extend over several lamella floors, Said load may for instance be a roll of paper 7d. In the state of the art it could be problematic that the roll of paper might contact the chains and get damaged as a result of that. In order to solve this the construction such as for instance shown in FIGS. 4A and 4B or 4C was invented.

The chain 11 is built up of links 12 having outer side plates 30a,b and inner side plates 31a,b as well as rollers 32 in the usual manner and pins 13. Said links are connected to a coupling piece 18, which is made of synthetic material, with the help of extended link pins 13, which coupling piece 18 is accommodated with an insertion part 19 in the hollow space at the end of lamella 10, bounded by the load carrying top wall 14, the bottom wall 16 and the side walls 15. The pin 13 is fittingly received in the receiving space 17 formed in the insertion part 19. By means of coupling piece 18 it is ensured that the lamellas 10 move along with the chain in the conveyance direction. The pins and their extensions received in the spaces 17 have the same cross section.

Special is the fact that the coupling piece 18 in the direction of the extension of the lamella 10 is continued in a collar 20, which is connected to the insertion part 19 by means of a bridge portion 21 which is formed as a unity with both. The bridge portion 21 as it were forms a neck to the collar portion 20, which itself is provided with a downward protrusion 22, which with its lower side 23 abuts the upper side of the chain. The collar portion 20 extends up to the outer side of the chain 11.

At the location of the bridge portion 21 at its lower side a notch 25 is formed, which notch is bounded by the downward protrusion 22. In it the upper edge of the side plates 30b, 31b of the link 12 can be received. The neck portion of the bridge portion 21 makes it possible that the collar portion 20 can slightly rotate, elastically, in the plane of the drawing. As a result a snap activity is realised, as a result of which in the situation shown in FIG. 4B the link 12 is secured with respect to the coupling piece 18, in the direction, as seen in the drawing, from left to right and vice versa. As a result the freedom of movement in the conveyor floor as present in the state of the art is limited and wear and tear and damage to the load carried by the conveyor floor is prevented.

Figure 4B:
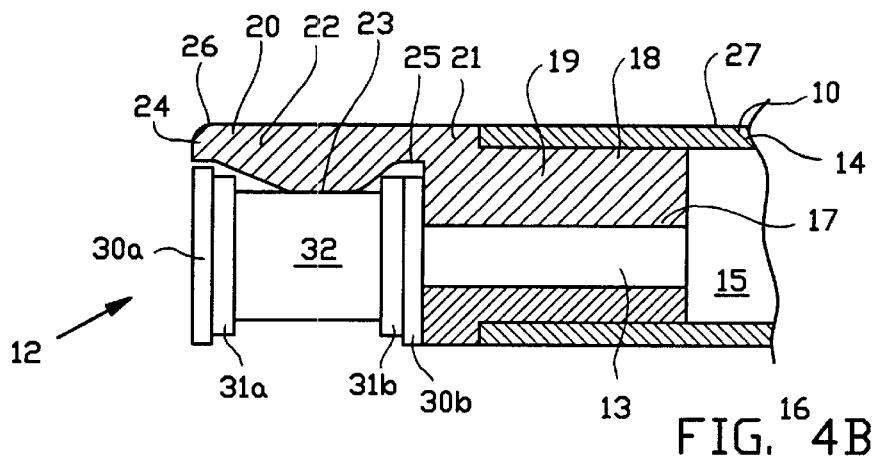

It can be seen in FIG. 4B that the top surface 26 of the collar portion 20 and the neck portion 21 lie in one plane with the top surface 27 of the lamella 10, so that the load to be carried is entirely shielded from the chain 11. Near the transitions between two adjacent lamella floors, for instance 8a and 8b, the collar portions 20 of the coupling pieces belonging to the adjacent lamellas 10 situated transverse to the conveyance direction, will at least be able to lie almost against each other, in order to limit the possibility of damage to the carried load as much as possible.

Figure 4C:
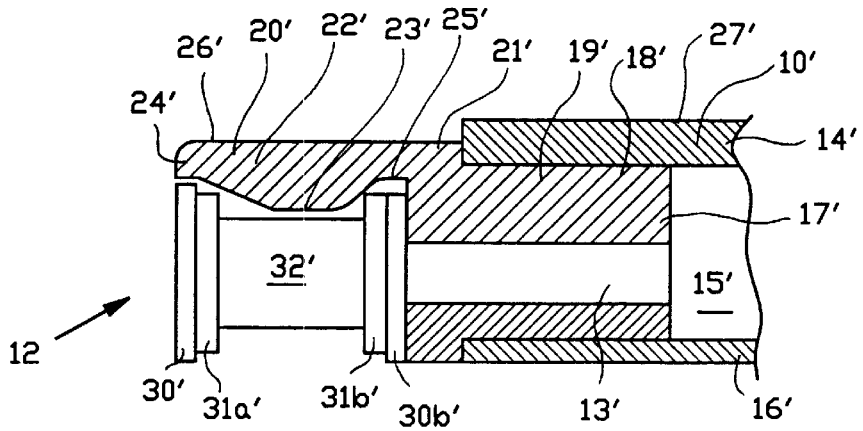
FIG. 4C shows a cross-section similar to FIG. 4B of an alternative embodiment.

In FIG. 4C the top wall 14' is designed thicker, so that it extends beyond the top surface 26', and that the bottom surface 23' is spaced apart from the link 12'. In this case a load cannot press down on the coupling piece and the downward protrusion 22' will not press down on the link 12', which is advantageous when the link parts have to be able to roll or have to turn at the ends of the floor.

Figure 4D:
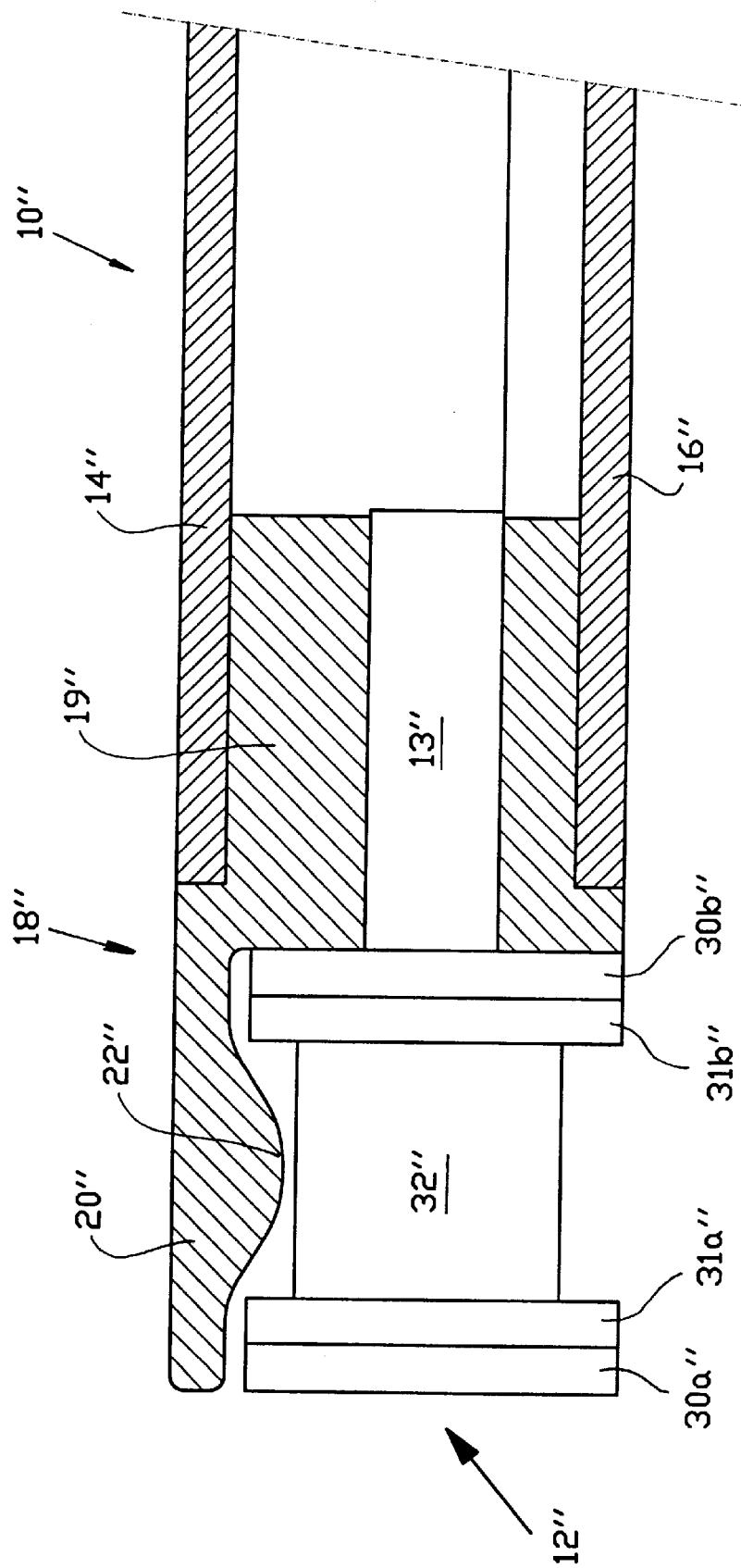
FIG. 4D shows a cross-section similar to FIG. 4B of a further preferred alternative embodiment.

In FIG. 4D, which is a preferred embodiment, the downward projection 22" has a smoothly curved surface spaced from the link 12". The smooth curved surface facilitates the relative movement of the collar portion 20" over the link 22" during the assembling of the link 12" and the coupling piece 18". The inner and outer side plates 30a", 30b", 31a", 31b" have the same height and lie flush with their lower edges with the lower surfaces of the coupling piece 18" and the bottom wall 16".

It will be understood that the conveyor floor thus built up can also be used in other arrangements in which a load has to be moved, such as in the loading/unloading track 5 of FIG. 1.

It is to be understood that the above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. Conveyor floor comprising lamellas extending transversely to a conveyance direction between opposite ends connected by coupling pieces to respective conveyor chains, the lamellas having support surfaces for supporting a load to be conveyed, and the coupling pieces having portions which respectively extend over the chains and insertion parts respectively received in receiving spaces of the lamellas.

2. Conveyor floor according to claim 1, in which the portion of the coupling piece extending over the chain extends at least up to the outer side of the chain in question.

3. Conveyor floor according to claim 1, in which the portion of the coupling piece extending over the chain supports on the chain with its lower side.

4. Conveyor floor according to claim 1, in which the portion of the coupling piece extending over the chain extends lower than the support surface of the lamellas.

5. Conveyor floor according to claim 1, in which the portion of the coupling piece extending over the chain has an upper surface which lies flush with the support surface of the lamellas.

6. Conveyor floor according to claim 1, in which the portion of the coupling piece extending over the chain with its lower part is spaced apart from the portion of chain situated below it.

7. Conveyor according to claim 6, in which said lower part has a smoothly convexly curved lower surface.

8. Conveyor floor according to claim 1, in which the coupling piece is connected to the chain by means of a snap connection.

9. Conveyor floor according to claim 1, in which the receiving space is hollow and upwardly and downwardly bounded.

10. Conveyor floor according to claim 9, in which the lamellas have upper and lower end edges, the coupling pieces form shoulders abutting the upper and lower end edges of the lamellas.

11. Conveyor floor according to claim 10, in which the upper and lower surfaces of the coupling pieces lie flush with the upper and lower surfaces of the lamellas.

12. Conveyor floor according to claim 9, in which the insertion part merges into the portion extending over the chain via a narrowing.

13. Conveyor floor according to claim 1, in which the coupling pieces are made of synthetic material.

14. Conveyor floor according to claim 13, in which the coupling pieces are made of polyethylene.

15. Conveyor floor according to claim 1, in which the chain is a link chain having pins that are extended towards the lamellas to fit into a receiving space in the coupling pieces.

16. Conveyor floor according to claim 15, in which the pins and their extensions have the same cross section.

17. Cargo space provided with a conveyor floor comprising a series of lamellas positioned transverse to the conveyance direction and at the ends connected by coupling pieces to conveyor chains situated adjacent to the lamellas, in which the lamellas have support surfaces for supporting a load to be conveyed, in which the coupling pieces have portions which extend over the chains connected to said coupling pieces and an insertion part, in which the lamellas have a receiving space for the insertion part of the coupling piece.

18. Loading/unloading track provided with a conveyor floor comprising a series of lamellas positioned transverse to the conveyance direction and at the ends connected by coupling pieces to conveyor chains situated adjacent to the lamellas, in which the lamellas have support surfaces for supporting a load to be conveyed, in which the coupling pieces have portions which extend over the chains connected to said coupling pieces and an insertion part, and in which the lamellas have receiving spaces for insertion parts of the coupling pieces.

19. Lorry provided with a conveyor floor comprising a series of lamellas positioned transverse to the conveyance direction and at the ends connected by coupling pieces to a conveyor chain, which is situated adjacent to the lamellas, in which the lamellas have a support surface for supporting a load to be conveyed, in which the coupling pieces have a portion which extends over the chain connected to said coupling piece and an insertion part, in which the lamellas have a receiving space for the insertion part of the coupling piece.

* * * * *